US007120626B2

United States Patent
Li et al.

(10) Patent No.: US 7,120,626 B2
(45) Date of Patent: Oct. 10, 2006

(54) CONTENT RETRIEVAL BASED ON SEMANTIC ASSOCIATION

(75) Inventors: Dongge Li, Palatine, IL (US); Nevenka Dimitrova, Yorktown Heights, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 441 days.

(21) Appl. No.: 10/295,668

(22) Filed: Nov. 15, 2002

(65) Prior Publication Data

US 2004/0098376 A1  May 20, 2004

(51) Int. Cl.
G06F 17/30 (2006.01)
(52) U.S. Cl. .......................... 707/3; 709/203
(58) Field of Classification Search ............ 707/1, 707/3–4, 6, 10, 102, 104.1; 709/203; 705/26
See application file for complete search history.

(56) References Cited

U.S. PATENT DOCUMENTS

| | | | |
|---|---|---|---|
| 6,154,754 A | 11/2000 | Hsu et al. ............ 707/513 |
| 6,243,713 B1* | 6/2001 | Nelson et al. .......... 707/104.1 |
| 6,343,298 B1 | 1/2002 | Savchenko et al. ....... 707/104 |
| 6,411,724 B1* | 6/2002 | Vaithilingam et al. ..... 382/100 |
| 6,598,054 B1* | 7/2003 | Schuetze et al. ........ 707/103 R |
| 2001/0028731 A1 | 10/2001 | Covell et al. ........... 382/118 |
| 2002/0103799 A1* | 8/2002 | Bradford et al. ........... 707/6 |
| 2002/0194197 A1* | 12/2002 | Flank ................... 707/104.1 |

FOREIGN PATENT DOCUMENTS

| EP | 1120720 A2 | 8/2001 |
|---|---|---|
| WO | 0045307 A1 | 8/2000 |

OTHER PUBLICATIONS

Yao Wang, Zhu Liu and Jin-Cheng Huang, "Multimedia Content Analysis", IEEE Signal Processing Magazine, Nov. 2000.*
U.S. Appl. No. 10/076,194, filed Feb. 14, 2002.
W.J. Krzanowski, "Principles of Multivariate Analysis", 1988, Oxford University Press, New York, USA, XP002282824, considered previously.

* cited by examiner

Primary Examiner—Leslie Wong
Assistant Examiner—Susan F. Rayyan

(57) ABSTRACT

A method and system which enable a user to query a multimedia archive in one media modality and automatically retrieve correlating data in another media modality without the need for manually associating the data items through a data structure. The correlation method finds the maximum correlation between the data items without being affected by the distribution of the data in the respective subspace of each modality. Once the direction of correlation is disclosed, extracted features can be transferred from one subspace to another.

21 Claims, 3 Drawing Sheets

CONTENT RETRIEVAL BASED ON SEMANTIC ASSOCIATION

CROSS-REFERENCE TO RELATED APPLICATIONS

This application incorporates by reference Assignee's application entitled Speaking Face Detection in TV Domain, filed on Feb. 14, 2002, inventors M. Li, D. Li, and N. Dimitrova, Ser. No. 10/076,194. This Li application provides background for the present invention.

BACKGROUND OF THE INVENTION

1. Field of the Invention

The present invention is directed to the field of multimedia data retrieval. It is particularly directed toward a method and system which enable a user to query a multimedia archive in one media modality and automatically retrieve correlating data in another media modality, without the need for manually associating the data items through a data structure.

2. Description of the Related Art

Over the past decade, the number of multimedia applications has grown exponentially and the volume of multimedia content has continued to soar. Enhanced computing power, the growth of the World Wide Web, and the availability of more compact and inexpensive storage media have fueled this growth. Naturally, an increased interest in multimedia content-based retrieval has also resulted, reflecting these phenomena.

However, existing approaches to retrieving multimedia content are limited. For example, in order to query a multimedia database to retrieve an image, the query must take the form of an image. It is not possible, to retrieve a picture of a waterfall, for example, using the sound of a waterfall as the query. Retrieval continues to be limited to a single multimedia domain, except for rudimentary cross-media retrieval by keyword.

U.S. patent application Ser. No. 10/076,194 describes a system and method for associating facial images with speech, without the need for face recognition. An object detection module provides a plurality of object features from the video face data and an audio segmentation module provides a plurality of audio speech features related to the video. The latent semantic indexing (LSI) technique is used to correlate the object features and to locate the face that is doing the speaking in the video. This application does not describe data retrieval and deals only with audio and video modalities.

U.S. Pat. No. 6,154,754 to Hse et al., entitled Automatic Synthesis of Semantic Information From Multimedia Documents, discloses a system for building hierarchical information structures for non-textual media. The pieces of information that are extracted from textual and nontextual media are termed AIUs (Anchorable Information Units) and are both represented in Standard Generalized Markup Language (SGML), so they can be processed in the same manner. An AIU object is a sequence of one or more parsable character strings or ASCII strings. The '754 patent is directed at linking textual and non-textual media documents, based upon a textual conversion, and does not address retrieval of video segments, for example.

European Patent Application No. EP 1 120 720 A2 to Ball et al., entitled User Interface for Data Presentation Systems, discloses a method for enhancing user interfaces. The user may present the user's query in a natural language format, as text, speech or point and click, and the method translates the query to a standard database query for retrieving text. If the natural language query cannot be effectively converted, the method supplies the user with additional information and continues to prompt the user for a query. This application does not address cross-modality retrieval of information.

International Patent Publication Number WO 00/45307 A1 entitled Multimedia Archive Description Scheme discloses a description scheme for a collection of multimedia records. The scheme relates records using a data structure called a cluster. The cluster is formed by evaluating the attributes of the record descriptions for similarity. Clusters can be grouped to form other clusters. Examples of clusters are Art, History, Expressionist, Impressionist. Cluster information must be stored for each record and limits the type of query which can retrieve a particular record.

United States Patent Application Publication No. U.S. Ser. No. 2001/0028731 A1, entitled Canonical Correlation Analysis of Image/Control-Point Location Coupling for the Automatic Location of Control Points, discloses a method for deriving hidden data, (control points), based upon observable data. Groups of control points are used to locate a feature of interest, such as a mouth, and could be located at the corners of the mouth, at the inner and outer edges of the lips, and at the centers thereof. The system discloses how to generate a model to locate these control points on unmarked images. The system is a single media modality system and does not retrieve data.

U.S. Pat. No. 6,343,298 B1 to Savchenko, et al. Entitled Seamless Multimedia Branching, discloses a method of authoring multimedia titles and storing multimedia content that implements seamless branching on digital media with high seek latency and a fixed upper bound on this latency. Continuous media content is arranged as individual clips on a storage medium and seamless branches between the clips are identified by an author. Individual clips are identified as carrier clips or non-carrier clips to guarantee seamlessness and to optimize memory usage and the availability of seamless jumps. Bridge data of a particular target media clip is interleaved or otherwise associated on the storage medium with a carrier clip that is upstream of the target media clip, and delivered along with the upstream media clip. This is not an automatic system and does not employ a statistical methodology.

Thus, there exists a need in the art for a cross-modality system which can automatically retrieve a media object in one modality that is related to a media object in a second modality without storing an association between the objects. What is needed is a means for seamlessly browsing heterogeneous multimedia content along with the ability to integrate different media sources based upon their semantic association.

SUMMARY OF THE INVENTION

The present invention addresses the foregoing needs by providing a system, (i.e., a method, an apparatus, and computer-executable process steps), for building an association between different types of multimedia content, so that browsing from one type of media to the other can take place smoothly. The association is built by using the canonical correlation statistical technique, well known in the art, to map low-level features of one modality, such as visual features, to low-level features of another modality, such as audio features, in a two-dimensional space based on their semantic association (correlation). The invention may also be used to query and retrieve in the same modality.

Initially, the system is provided with multimedia samples, from which features are extracted. For example, visual features such as texture, color, and edges are extracted from a video clip of an explosion and features such as bandwidth, pitch, and mel-frequency cepstral coefficients (MFCC) are extracted from an audio clip of the explosion's sound. The features to be extracted and the method of extraction are well-known in the art.

Although the correlation between these two sets of features may not seem obvious at first blush, a thoughtful examination indicates that in fact, they are. For example, using an explosion as an example, colors such as growing redness will be extracted from the video and sound characterized by a particular pattern of pitch and amplitude change will be extracted from the audio. Statistical analysis will reveal the correlation between these features and provide a pattern of association for linking the audio and video.

The statistical technique, canonical correlation, produces optimized matrices A and B that are used to determine the correlation of candidate image A having feature set X with an audio clip B having feature set Y. These matrices can be used to evaluate X (or Y) using Y (or X). In other words, the correlation is bi-directional and as a result, the sound clip can be used to retrieve the associated video or the associated video can be used to retrieve the sound clip. Alternatively, the latent semantic indexing technique, also well-known in the art, can be used to develop the matrices.

The present invention has the advantage of enabling the user to browse and search multimedia content of different modalities in a manner that minimizes bandwidth. For example, instead of passing a query in the form of an image over a network, for example the Internet, only a voice query needs to be transmitted to retrieve an image.

The present invention also has the advantage of reducing the cost of equipment needed for querying a multimedia database containing images. A query can be developed using only a microphone, for example, rather than requiring a graphic input device.

The present invention also has the advantage of compensating for corrupted input. For example, if a sound is corrupted by background noise, an associated visual feature can be used, instead, as the basis for a query.

The present invention also offers the user greater choice in browsing a multimedia database because the user can select the modality the user prefers and with which the user is most familiar. For example, a child can produce the sound, (roar), of the Disney character Simba and retrieve a picture of Simba rather than having to know how to type the letters spelling the character's name.

The present invention is not limited to auditory and visual searching but can use other modalities such as taste, galvanic skin response, or tactile characteristics. For example, the aroma of a particular wine can be used as a query to retrieve identifying information about the wine, such as grape, vineyard, and town of origin, using the same technique of feature extraction and correlation described above. In the case of an aroma, chemical features would be extracted and represented digitally. Similarly, the inventive technique can be used to associate biometric data, such as a retinal pattern, with information about an individual such as the individual's picture, thereby enabling a user to query a multimedia database of individual characteristics in different modalities, using any modality as the basis for the query and retrieving information in any other modality.

The associations developed through the correlation process can also be used to make avatars work in a realistic way. For example, when an avatar says the word "stop," the avatar's face will move in a manner associated with that word. The invention can also be used to search for emotions, such as those depicted in The Official Smiley Dictionary (see Appendix). In this example the retrieval is an "angry" sound or a "happy face", for example, and the query is a related word or phrase.

Still further features and aspects of the present invention and various advantages thereof will be more apparent from the accompanying drawings and the following detailed description of the preferred embodiments.

DETAILED DESCRIPTION OF THE INVENTION

Figure 1:
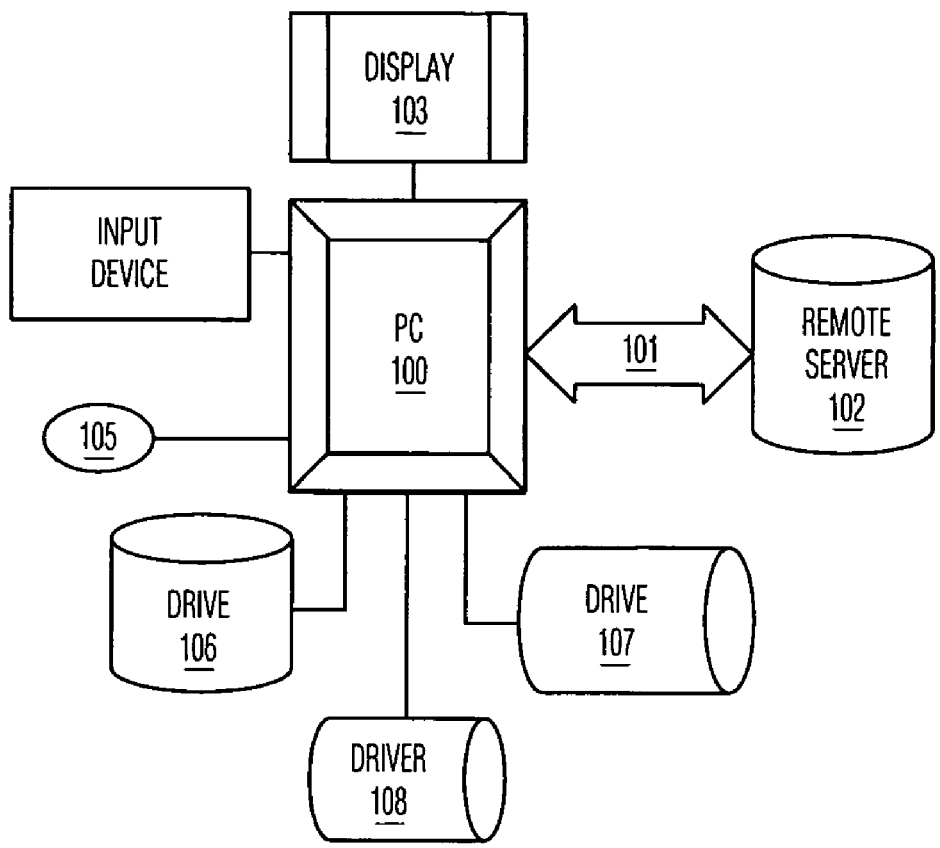
FIG. 1 depicts a system on which the present invention may be implemented.

FIG. 1 shows a system in which the present invention can be implemented. In a preferred embodiment, the system is implemented by computer readable code executed by a data processing apparatus. The code may be stored in a memory within the data processing apparatus or read/downloaded from a memory medium such as a DVD/CD-ROM or floppy disk. In other embodiments, hardware circuitry may be used in place of, or in combination with, software instructions to implement the invention. For example, the invention may implemented on a digital television platform or set-top box using a Trimedia processor for processing and a television monitor for display.

As shown in FIG. 1, a computer 100 includes a network connection 101 for interfacing to a data network, such as a variable-bandwidth network, the Internet, and/or a fax/modem connection for interfacing with other remote sources 102 such as a video or a digital camera (not shown). The system may also operate in stand-alone mode. The computer 100 also includes a display 103 for displaying information (including video data) to a user, an input device 104 such as a keyboard, microphone, or graphics tablet for inputting a query or other command, a mouse 105 for positioning a cursor on the display 103 and for inputting user commands, a disk drive 106 for reading from and writing to floppy disks installed therein, and a CD-ROM/DVD drive 107 for accessing information stored on a CD-ROM or DVD. The computer 100 may also have one or more peripheral devices attached thereto, such as a pair of video conference cameras for inputting images, or the like, and a printer 108 for outputting images, text, or the like.

Other embodiments may be implemented by a variety of means in both hardware and software, and by a wide variety of controllers and processors. For example, it is noted that a laptop or palmtop computer, video conferencing system, a personal digital assistant (PDA), a telephone with a display, television, set-top box or any other type of similar device may also be used.

Figure 2:
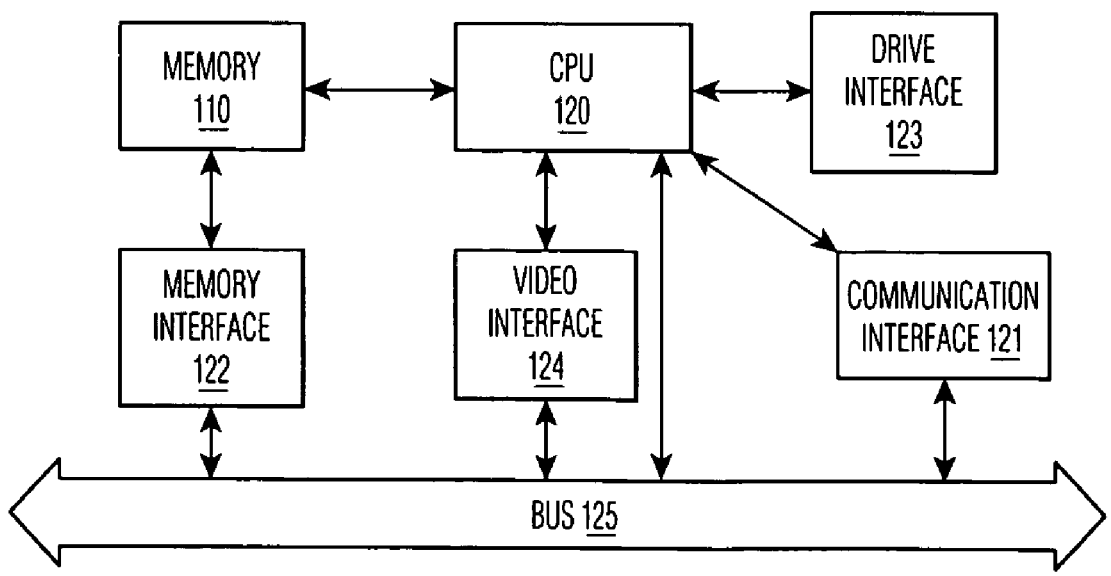
FIG. 2 shows a conceptual diagram of the system.

FIG. 2 shows the internal structure of the computer 100 that includes a memory 110 that may include a Random Access Memory (RAM), Read-Only Memory (ROM) and a computer-readable medium such as a hard disk. The items stored in the memory 110 include an operating system, various data and applications. The applications stored in memory 110 may include a video coder, a video decoder and a frame grabber. The video coder encodes video data in a conventional manner, and the video decoder decodes video data that has been coded in the conventional manner. The frame grabber allows single frames from a video signal stream to be captured and processed.

Also included in the computer 100 are a central processing unit (CPU) 120, a communication interface 121, a memory interface 122, a CD-ROM/DVD drive interface 123, a video interface 124 and a bus 125. The CPU 120 comprises a microprocessor or the like for executing computer readable code, i.e., applications, such those noted above, out of the memory 110. Such applications may be stored in memory 110 (as noted above) or, alternatively, on a floppy disk in disk drive 106 or a CD-ROM in CD-ROM drive 107. The CPU 120 accesses the applications (or other data) stored on a floppy disk via the memory interface 122 and accesses the applications (or other data) stored on a CD-ROM via CD-ROM drive interface 123.

The CPU 120 may represent, e.g., a microprocessor, a central processing unit, a computer, a circuit card, a digital signal processor or an application-specific integrated circuit (ASICs). The memory 110 may represent, e.g., disk-based optical or magnetic storage units, electronic memories, as well as portions or combinations of these and other memory devices.

Various functional operations associated with the system 10 may be implemented in whole or in part in one or more software programs stored in the memory 110 and executed by the CPU 120. This type of computing and media processing device may be part of an advanced set-top box.

Figure 3:
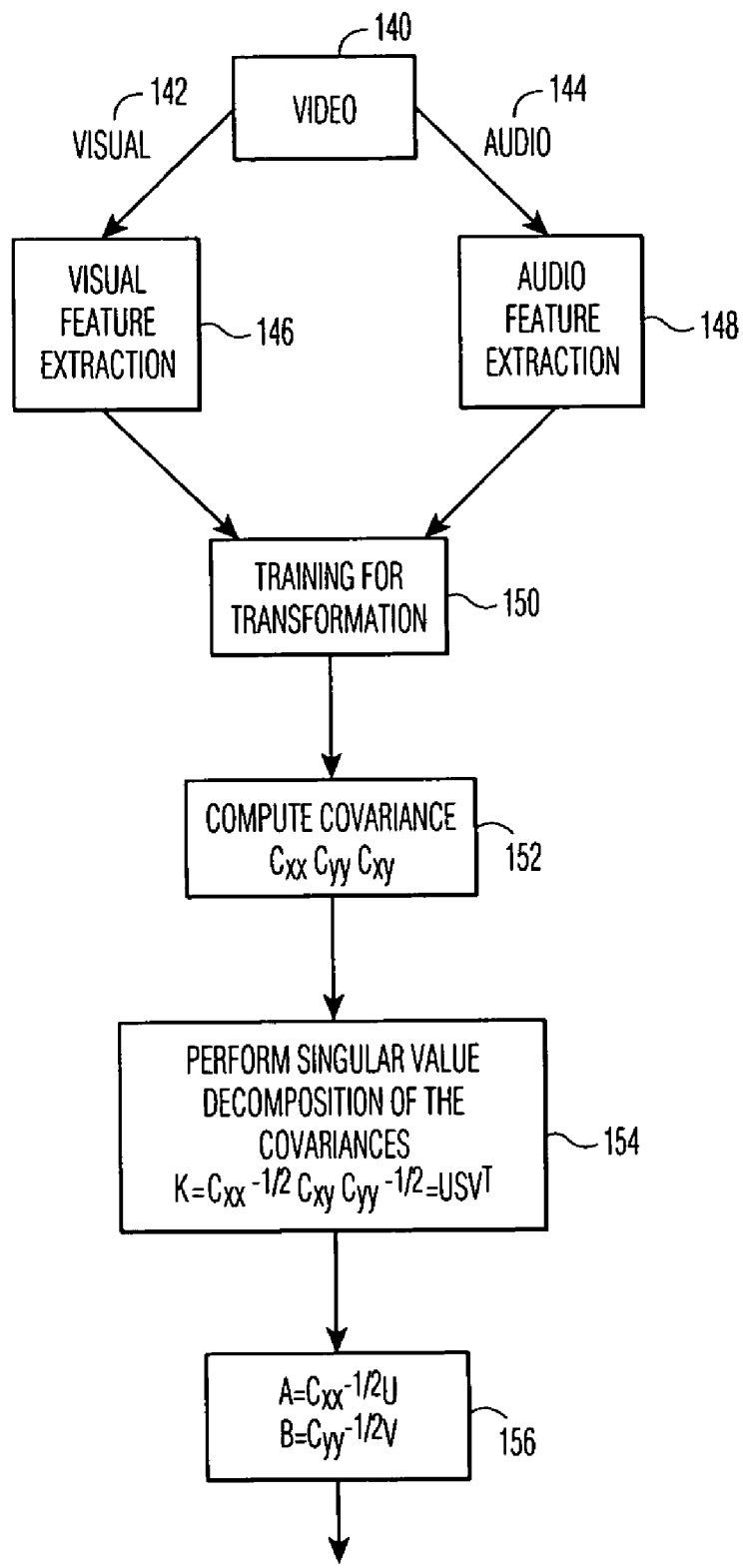
FIG. 3 is a flowchart showing the operation of the system.
Figure 3A:
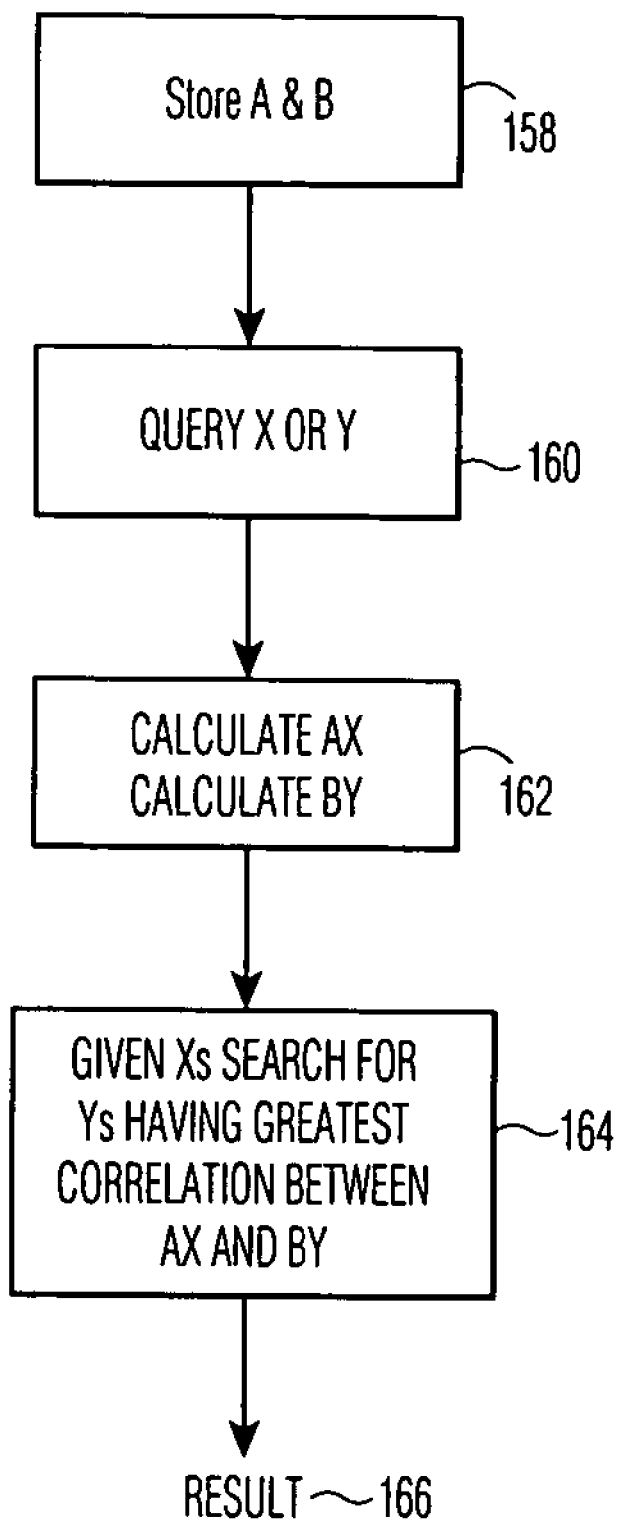

FIGS. 3 and 3a illustrate the operation of the invention. In FIG. 3, the video 140 is input to the CPU FIG. 2 reference numeral 120 through the video interface FIG. 2 reference numeral 124. The video 140 is separated into audio and visual components visual 142 and audio 144. Visual features are extracted from the visual 142 by the visual feature extraction step 146 and audio features are extracted from the audio 144 by the audio feature extraction step 148. This process is well described in Speaking Face Detection in TV Domain, filed on Feb. 14, 2002, inventors M. Li, D. Li, and N. Dimitrova, Ser. No. 10/076,194, pages 10–11, attached herewith.

In step 150, the system is trained on sample input representing the type of information which will be stored in the multimedia database. In step 152, the covariances of the audio and visual information, represented by X and Y, are computed. In step 154, singular value decomposition is performed on the covariances yielding the intermediate product $USV^T$. In step 156, the A and B matrices are derived which will transform video, for example, into space that is better correlated with audio, for example.

Steps 152 through 156 can be described mathematically as follows:

$A = C_{xx}^{-1/2} U$ and $B = C_{yy}^{-1/2} V$ are derived so that the correlation between AX and BY is maximized. A and B are orthogonal matrices and the det(A)=det(B)=1 where, $C_{xx} = E\{(X-m_x)(X-m_x)^T\} C_{yy} = E\{(Y-m_y)(Y-m_y)^T\} C_{xy} = E\{(X-m_x)(\&-m_y)^T\}$ $K = C_{xx}^{-1/2} \cdot C_{xy} \cdot C_{yy}^{-1/2} = U \cdot S \cdot V^T$ X and Y are feature sets from different modalities. $C_{xx}$, $C_{yy}$, and $C_{xy}$ are covariance matrices. $M_x$ and $M_y$ are mean vectors. U, S, and V are obtained from singular value decomposition.

The effect of the above mathematical manipulation is to find the best correlation without regard to the distribution of each feature set. In the figure below, the correlation direction disclosed by the canonical correlation procedure is between a1 and v1^v2 subspace. The correlation direction disclosed is not affected by the distribution on v1 and v2 subspace.

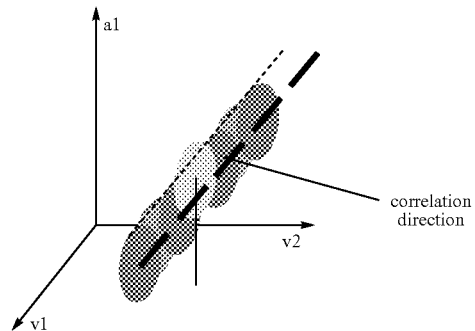

Once the direction of correlation is found, the above equations can be used to transfer features from one subspace to another subspace, for example, from audio to video.

Turning now to FIG. 3a, in step 158, the A and B matrices are stored. In step 160, a query using video(X) or audio (Y) is initiated against a multimedia database. In step 162, the A and B matrices are used to associate X and Y. When there is a query from modality X, using the extract features of X, AX can be calculated. For every item in the database for modality B, BY can then be calculated. When there is a query from modality Y, using the extract features of Y, BY can be calculated. For every item in the database for modality A, AX can then be calculated.

After AX and BY are calculated, the database is searched for the X or Y having the greatest correlation between AX and BY. So, for example, if the query item was Simba's roar, the search item could be a picture of Simba, for example. For this example, in steps 164, a number of pictures of Simba would be retrieved and displayed in step 166.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

What is claimed is:

1. A multimedia system comprising:
    a query module generating a query in a plurality of media modalities;
    a database including a plurality of matrices, each matrix corresponding to one of the media modalities, wherein each matrix builds a correlation between the corresponding media modality and another media modality;
    an object detection module extracting a first plurality of object features from the query and a second plurality of object features from the database wherein the first plurality of object features and the second plurality of object features are extracted from media representing different modalities; and
    a processor coupled to the object detection module, the processor being trained on the plurality of matrices of the database to maximize a bi-directional correlation of cross-modality media using sample data, the processor determining a correlation between the first plurality of object features and the second plurality of object features and to retrieve those items from the database which have a correlation at least equal to a predetermined maximum degree of correlation.

2. The system as in claim 1, wherein the correlation is calculated using a canonical correlation methodology.

3. The system as in claim 1, wherein the correlation is calculated using a latent semantic indexing methodology.

4. The system of claim 1, wherein one of the media modalities is a video clip of a character, and a further media modality is an audio clip of the character.

5. The system of claim 1, wherein one of the media modalities is a picture of a person, and a further media modality is a biometric feature of the person.

6. The system of claim 5, wherein the biometric feature is a retinal image.

7. The system of claim 1, wherein one of the media modalities is an unknown liquid, and a further media modality is an aroma having chemical features.

8. The system of claim 7, wherein the unknown liquid is a beverage.

9. The system of claim 1, wherein one of the media modalities is a sound associated with an emotion, the emotion being chosen from a standard list of emotions, and a further media modality is a word for the emotion having textual features.

10. A multimedia system comprising:
   a query module capable of generating a query in a plurality of media modalities;
   a database capable of storing data representing a plurality of media modalities;
   an object detection module capable of extracting a first plurality of object features from the query and a second plurality of object features from the database wherein the first plurality of object features and the second plurality of object features are extracted from media representing different modalities; and
   a processor coupled to the object detection modules, wherein the processor is arranged to determine a correlation between the first plurality of object features and the second plurality of object features and to retrieve those items from the database which have a correlation at least equal to a predetermined maximum degree of correlation, wherein prior to retrieval, the system is trained to correlate cross-modality media using sample data, wherein the training produces orthogonal matrices $A=C_{xx}^{-1/2}U$ and $B=C_{yy}^{-1/2}V$ wherein $\det(A)=\det(B)=1$ and $C_{xx}=E\{(X-m_x)(X-m_x)^T\}$, $C_{yy}=E\{(Y-m_y)(Y-m_y)^T\}$, $C_{xy}=E\{(X-m_x)(y-m_y)^T\}$, $K=C_{xx}^{-1/2}\cdot C_{xy}\cdot C_{yy}^{-1/2}=U\cdot S\cdot V^T$ and the correlation between AX representing a first feature set in a first modality and BY representing a second feature set in a second modality is greatest, thereby enabling a transfer of features from the first modality to the second modality, and wherein A and B are orthogonal matrices, X and Y are feature sets from different modalities, $C_{xx}$, $C_{yy}$, and $C_{xy}$ are covariance matrices, $m_x$ and $m_y$ are mean vectors, and U, S, and V are obtained from singular value decomposition.

11. The system as in claim 10 wherein AX, the quety, representing the first feature set can be identified given only BY, the result of the query, representing the second feature set, in that BY has the greatest correlation with AX.

12. A method of retrieving at least one item of interest to a user from a multimedia archive comprising the steps of:
   generating a query in a plurality of media modalities;
   generating a plurality of matrices, each matrix corresponding to one of the media modalities, wherein each matrix builds a correlation between the corresponding media modality and another media modality;
   training the plurality of matrices to maximize a bi-directional correlation of cross-modality media using a sample data;
   extracting a first plurality of object features from the query, the object features representing a first modality;
   extracting a second plurality of object features from items in the multimedia archive, the object features representing a second modality, the archive including the plurality of matrices;
   determining a correlation between the first plurality of object features and the second plurality of object features using the plurality of matrices;
   retrieving those items from the archive which have object features having a correlation with the object features in the query at least equal to a predetermined maximum degree of correlation.

13. The method as in claim 12, wherein the method of correlation is canonical correlation.

14. The method as in claim 12, wherein the method of correlation is latent semantic indexing.

15. The method as in claim 12, wherein the step of using sample data comprises producing orthogonal matrices of modality pairs as an intermediate step.

16. A method of retrieving at least one item of interest to a user from a multimedia archive comprising the steps of:
   generating a query;
   extracting a first plurality of object features from the query, the object features representing a first modality;
   extracting a second plurality of object features from items in the multimedia archive, the object features representing a second modality;
   determining a correlation between the first plurality of object features and the second plurality of object features; and
   retrieving those items from the archive which have object features having a correlation with the object features in the query at least equal to a predetermined maximum degree of correlation using sample data to generate correlation matrices to correlate cross-modality media, wherein the matrices generated are represented by $A=C_{xx}^{-1/2}U$ and $B=C_{yy}^{-1/2}V$ and wherein $\det(A)=\det(B)=1$ and $C_{xx}=E\{(X-m_x)(X-m_x)^T\}$, $C_{yy}=E\{(Y-m_y)(Y-m_y)^T\}$, $C_{xy}=E\{(X-m_x)(Y-m_y)^T\}$, $K=C_{xx}^{-1/2}\cdot C_{xy}\cdot C_{yy}^{-1/2}=U\cdot S\cdot V^T$ and the correlation between AX representing a first feature set in a first modality and BY representing a second feature set in a second modality is greatest, thereby enabling a transfer of features from the first modality to the second modality, and wherein A and B are orthogonal matrices, X and Y are feature sets from different modalities, $C_{xx}$, $C_{yy}$, and $C_{xy}$ are covariance matrices, $m_x$ and $m_y$ are mean vectors, and U, S, and V are obtained from singular value decomposition.

17. The method as in claim 16, wherein AX, the query, representing the first feature set can be identified given only BY, the result of the query, representing the second feature set, in that BY has the greatest correlation with AX.

18. Computer-executable process steps, the computer-executable process steps being stored on a computer-readable medium enabling a user to retrieve media of interest from a database of multimedia comprising:
   a query generation step for obtaining a query from the user, the query being in a first media modality;
   a matrices generating step generating a plurality of matrices, each matrix corresponding to one of the media modalities, wherein each matrix builds a correlation between the corresponding media modality and another media modality;

a training step training the plurality of matrices to maximize a bi-directional correlation of cross-modality media using a sample data;

a first extracting step for extracting a first plurality of object features from the query;

a second extracting step for extracting a second plurality of object features from items in the multimedia archive, the object features representing a second media modality, the archive including the plurality of matrices;

a correlation calculation step for determining a correlation between the first plurality of object features and the second plurality of object features using the plurality of matrices; and a retrieval step for retrieving those items from the database which have object features having a correlation with the object features in the query at least equal to a predetermined maximum degree of correlation.

19. A system for retrieving at least one item of interest to a user from a multimedia archive comprising:

means for generating a query in a first media modality;

means for generating a plurality of matrices, each matrix corresponding to one of the media modalities, wherein each matrix builds a correlation between the corresponding media modality and another media modality;

means for training the plurality of matrices to maximize a bi-directional correlation of cross-modality media using a sample data;

means for extracting a first plurality of object features from the query;

means for extracting a second plurality of object features from items in the multimedia archive, the archive including the plurality of matrices;

means for determining a correlation between the first plurality of object features and the second plurality of object features, the second plurality of object features being extracted from a second media modality using the plurality of matrices; and means for retrieving those items from the archive which have object features having a correlation with the object features in the query at least equal to a predetermined maximum degree of correlation.

20. A method for retrieving a query in a first media modality, when only a result of the query, in a second media modality, is initially known, comprising the steps of:

retrieving a stored matrix, B, for transforming features in the second modality into feature space that is correlated with the first modality, wherein the matrix B was produced during a training procedure to correlate items in the first modality A with items in the second modality B, and vice-versa, such that $A=C_{xx}^{-1/2}U$ and $B=C_{yy}^{-1/2}V$ wherein $\det(A)=\det(B)=1$ and $C_{xx}=E\{(X-m_x)(X-m_x)^T\}$, $C_{yy}=E\{(Y-m_y)(Y-m_y)^T\}$, $C_{xy}=E\{(X-m_x)(Y-m_y)^T\}$, $K=C_{xx}^{-1/2} \cdot C_{xy} \cdot C_{yy}^{-1/2}=U \cdot S \cdot V^T$ and the correlation between AX representing a first feature set in the first modality and BY representing a second feature set in the second modality is greatest;

extracting object features from items in the second modality;

calculating AY for the second modality;

extracting object features from items in the first modality, stored in a multimedia database;

calculating AX for each of the items;

correlating AX and AY; and retrieving the X having the greatest correlation between AX and BY, and wherein A and B are orthogonal matrices, X and Y are feature sets from different modalities, $C_{xx}$, $C_{yy}$, and $C_{xy}$ are covariance matrices, $m_x$ and $m_y$ are mean vectors, and U, S, and V are obtained from singular value decomposition.

21. The system as in claim 1, wherein an intermediate step of the training produces orthogonal matrices of modality pairs.

* * * * *